(12) United States Patent
Bai et al.

(10) Patent No.: US 11,553,486 B2
(45) Date of Patent: Jan. 10, 2023

(54) INFORMATION TRANSMISSION METHOD, NETWORK DEVICE, AND TERMINAL

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/607,386

(22) PCT Filed: Apr. 24, 2020

(86) PCT No.: PCT/CN2020/086724
§ 371 (c)(1),
(2) Date: Oct. 28, 2021

(87) PCT Pub. No.: WO2020/221128
PCT Pub. Date: Nov. 5, 2020

(65) Prior Publication Data
US 2022/0150892 A1 May 12, 2022

(30) Foreign Application Priority Data
Apr. 30, 2019 (CN) .......... 201910364213.5

(51) Int. Cl.
*H04W 4/00* (2018.01)
*H04W 72/04* (2009.01)
*H04L 5/00* (2006.01)

(52) U.S. Cl.
CPC ....... *H04W 72/0446* (2013.01); *H04L 5/0048* (2013.01)

(58) Field of Classification Search
CPC .......... H04W 72/0446; H04L 5/0048
(Continued)

(56) References Cited

U.S. PATENT DOCUMENTS

| 2020/0267748 | A1* | 8/2020 | Khoshnevisan .. H04W 72/1289 |
| 2020/0304242 | A1 | 9/2020 | Jiang et al. |

(Continued)

FOREIGN PATENT DOCUMENTS

| CN | 107801246 A | 3/2018 |
| CN | 108401482 A | 8/2018 |

(Continued)

OTHER PUBLICATIONS

Sony ( Discussion on the RV sequence within repetitions for UL transmission without UL grant, Reno, USA, November 27-Dec. 1, 2017, R1-1720462) (Year: 2017).*

(Continued)

*Primary Examiner* — Maharishi V Khirodhar
(74) *Attorney, Agent, or Firm* — Ladas & Parry, LLP

(57) ABSTRACT

An information transmission method, a network device and a terminal are provided. The method includes: sending configuration information of a first configuration of a physical uplink shared channel or a physical downlink shared channel; determining RVs corresponding to TOs in a second configuration of the physical uplink shared channel or the physical downlink shared channel according to the configuration information, wherein, RVs corresponding to TOs overlapped in time domain in the first configuration and in the second configuration are the same; transmitting the physical uplink shared channel or the physical downlink shared channel according to the RVs.

10 Claims, 6 Drawing Sheets

(58) Field of Classification Search
USPC .......................................................... 370/336
See application file for complete search history.

(56) References Cited

U.S. PATENT DOCUMENTS

2020/0374912 A1* 11/2020 Takeda .............. H04W 72/0446
2021/0006369 A1* 1/2021 Bai .................... H04W 72/0453
2021/0385854 A1* 12/2021 Wu ........................ H04W 74/02

FOREIGN PATENT DOCUMENTS

EP          3291598 A1      3/2018
WO    WO 2019/033993 A1   2/2019

OTHER PUBLICATIONS

Sony ( R1 -1902178 , Considerations on PUSCH enhancements for URLLC, Athens, Greece, Feb. 25-Mar. 1, 2019) (Year: 2019).*
ZTE, Sanechips ( R1-1717442, Remaining details of UL transmission without grant) (Year: 2017).*
NEC ( R1-1718230, Remaining issues on UL transmission without grant) (Year: 2017).*
ZTE, Sanechips ( R1-1719516, Remaining details of UL transmission without grant) (Year: 2017).*
NTT DOCOMO,Inc. (R1-1903341, Summary of 7.2.6.3 Enhanced configured grant PUSCH transmissions , Athens, Greece, Feb. 25-Mar. 1, 2019) (Year: 2019).*
CATT, "On enhancements to configured UL grant operation," 3GPP TSG RAN WG1 Meeting #94, R1-1808412, Gothenburg, Sweden, Aug. 20-24, 2018, entire document.
International Search Report and Written Opinion issued for International Application No. PCT/CN2020/086724 dated Aug. 11, 2020.
Partial Supplementary European Search Report for European Application No. 20799490.6 dated May 18, 2022.
Zte et al.: "Remaining details of UL transmission without grant", 3GPP Draft; R1-1719516 Remaining Details of UL Transmission Without Grant Final, 3rd Generation Partnership Project (3GPP), Mobile Competence Centre; 650, Route Des Lucioles; F-06921 Sophia-Antipol vol. RAN WGI, No. Reno, USA; Nov. 27, 2017-Nov. 18, 2017 (Nov. 18, 2017), entire document.
Zte et al.: "Remaining details of UL transmission without grant", 3GPP Draft; R1-1717442 Remaining Details of UL Transmission Without Grant, $3^{rd}$ Generation Partnership Project (3GPP), Mobile Competence Centre; 650, Route Des Lucioles; F-06921 Sophia-Antipolis Cede vol. RAN WGI, No. Prague, CZ; Oct. 9, 2017-Oct. 13, 2017 (Oct. 8, 2017), entire document.

* cited by examiner

INFORMATION TRANSMISSION METHOD, NETWORK DEVICE, AND TERMINAL

CROSS-REFERENCE TO RELATED APPLICATIONS

This application is a U.S. national phase application of a PCT Application No. PCT/CN2020/086724 filed on Apr. 24, 2020, which claims a priority to Chinese Patent Application No. 201910364213.5 filed in China on Apr. 30, 2019, the disclosures of which are incorporated herein by reference in their entireties.

TECHNICAL FIELD

The present disclosure relates to the field of communications technology, and in particular, relates to an information transmission method, a network device, and a terminal.

BACKGROUND

With development and evolution of requirements on a mobile communication service, a new radio communication system (i.e., Fifth Generation New RAT (5G NR)) is being studied as a next-generation mobile communication system. In a 5G NR system, an important requirement is communication having a low-latency and a high-reliability. Transmission schemes such as Ultra Reliable Low Latency Communications (URLLC) have emerged. For example, in an uplink transmission scheme of the URLLC, in order to reduce the latency, a scheduling-free scheme is adopted, and in order to increase the reliability, a repetitive transmission scheme is adopted.

Since data arrival at a terminal side is random, a configuration period is defined in the scheduling-free repetitive transmission scheme in uplink, and in this case, it is required that after the terminal starts transmission within one period, the terminal must end transmission within the period, the transmission cannot cross the period. This requirement will cause the actual number of repetitive transmissions to be less than the configured number of repetitive transmissions, which will also affect the reliability. On a premise that data is transmitted as soon as possible after arrival of the data, multiple parallel configurations, i.e., a multi-configuration scheme in which starting positions of the configurations in the period are staggered, are adopted in order to improve the reliability.

In the relate art, different ones of the configurations are distinguished by different frequency-domain positions or Demodulation Reference Signals (DMRS), and the base station determines a configuration used for transmission by performing blind detection on a resource location or a Demodulation Reference Signals (DMRS), and accordingly, a Redundancy Version (RV) corresponding to any transmission occasion (TO) is determined based on a position of a first TO in the used configuration. This mode needs to consume a large amount of frequency-domain resources or DMRSs, which affects the efficiency.

SUMMARY

The present disclosure provides an information transmission method, a network device, and a terminal. The present disclosure solves the problem of a low resource efficiency introduced by determining RVs corresponding to TOs of each configuration in a multi-configuration transmission scheme.

In a first aspect, an information transmission method is provided in embodiments of the present disclosure. The method includes: sending configuration information of a first configuration of a physical uplink shared channel or a physical downlink shared channel; determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; transmitting the physical uplink shared channel or the physical downlink shared channel according to the RVs.

Determining the RVs corresponding to the TOs in the second configuration of the physical uplink shared channel or the physical downlink shared channel according to the configuration information includes: determining an RV corresponding to a first TO in the first configuration according to the configuration information; determining, according to the RV corresponding to the first TO, an RV corresponding to a second TO overlapping with the first TO in time domain in the second configuration.

The method further includes: sending indication information, the indication information being used to indicate determining RVs corresponding to TOs in a second configuration according to the configuration information of the first configuration.

DeModulation Reference Signals (DMRS) corresponding to the first TO and the second TO overlapped in time domain are the same.

DMRS corresponding to each second TO in a first period is the same as a DMRS corresponding to a target TO, wherein, the target TO is a first TO, in the first configuration, that overlaps with a first second TO in the first period in time domain, the first period is one period in the second configuration.

DMRSs corresponding to first TOs in one period in the first configuration are the same, and DMRSs corresponding to first first TOs in at least two adjacent periods in the first configuration are different.

In a second aspect, a network device is further provided in the embodiments of the present disclosure. The network device includes a transceiver, a storage, a processor and a computer program stored on the storage and executable by the processor, wherein, when the processor executes the computer program, the processor implements following steps: sending configuration information of a first configuration of a physical uplink shared channel or a physical downlink shared channel; determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; transmitting the physical uplink shared channel or the physical downlink shared channel according to the RVs.

When the processor executes the computer program, the processor implements following steps: determining an RV corresponding to a first TO in the first configuration according to the configuration information; determining, according to the RV corresponding to the first TO, an RV corresponding to a second TO overlapping with the first TO in time domain in the second configuration.

When the processor executes the computer program, the processor implements a following step: sending indication information, the indication information being used to indicate determining the RVs corresponding to the TOs in the second configuration according to the configuration information of the first configuration.

DeModulation Reference Signals (DMRS) corresponding to the first TO and the second TO overlapped in time domain are the same.

A DMRS corresponding to each second TO in a first period is the same as a DMRS corresponding to a target TO, wherein, the target TO is a first TO, in the first configuration, that overlaps with a first second TO in the first period in time domain, the first period is one period in the second configuration.

DMRSs corresponding to first TOs in one period in the first configuration are the same, and DMRSs corresponding to first first TOs in at least two adjacent periods in the first configuration are different.

In a third aspect, a network device is provided in the embodiments of the present disclosure. The network device includes: a sending module, configured for sending configuration information of a first configuration of a physical uplink shared channel or a physical downlink shared channel; a determining module, configured for determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; a transmitting module, configured for transmitting the physical uplink shared channel or the physical downlink shared channel according to the RVs.

In a fourth aspect, an information transmission method is provided in the embodiments of the present disclosure. The method includes: obtaining configuration information of a first configuration of a physical uplink shared channel or a physical downlink shared channel; determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; transmitting the physical uplink shared channel or the physical downlink shared channel according to the RVs.

Determining the RVs corresponding to the TOs in the second configuration of the physical uplink shared channel or the physical downlink shared channel according to the configuration information includes: determining an RV corresponding to a first TO in the first configuration according to the configuration information; determining, according to the RV corresponding to the first TO, an RV corresponding to a second TO overlapping with the first TO in time domain in the second configuration.

The method further includes: receiving indication information, the indication information being used to indicate determining the RVs corresponding to the TOs in the second configuration according to the configuration information of the first configuration; wherein determining the RVs corresponding to the TOs in the second configuration of the physical uplink shared channel or the physical downlink shared channel according to the configuration information includes: determining an RV corresponding to each TO in the second configuration according to the configuration information and the indication information.

DeModulation Reference Signals (DMRS) corresponding to the first TO and the second TO overlapped in time domain are the same.

The DMRS corresponding to each second TO in a first period is the same as a DMRS corresponding to a target TO, wherein, the target TO is a first TO, in the first configuration, that overlaps with a first second TO in the first period in time domain, the first period is one period in the second configuration.

DMRSs corresponding to first TOs in one period in the first configuration are the same, and DMRSs corresponding to first first TOs in at least two adjacent periods in the first configuration are different.

In a fifth aspect, a terminal is further provided in the embodiments of the present disclosure. The terminal includes a transceiver, a storage, a processor, and a computer program stored on the storage and executable by the processor, wherein when the processor executes the computer program, the processor implements following steps: obtaining configuration information of a first configuration of a physical uplink shared channel or a physical downlink shared channel; determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; transmitting the physical uplink shared channel or the physical downlink shared channel according to the RVs.

When the processor executes the computer program, the processor implements following steps: determining an RV corresponding to a first TO in the first configuration according to the configuration information; determining, according to the RV corresponding to the first TO, an RV corresponding to a second TO overlapping with the first TO in time domain in the second configuration.

When the processor executes the computer program, the processor implements following steps: receiving indication information, the indication information being used to indicate determining the RVs corresponding to the TOs in the second configuration according to the configuration information of the first configuration; determining an RV corresponding to each TO in the second configuration according to the configuration information and the indication information.

DeModulation Reference Signals (DMRS) corresponding to the first TO and the second TO overlapped in time domain are the same.

The DMRS corresponding to each second TO in a first period is the same as a DMRS corresponding to a target TO, wherein, the target TO is a first TO, in the first configuration, that overlaps with a first second TO in the first period in time domain, the first period is one period in the second configuration.

DMRSs corresponding to first TOs in one period in the first configuration are the same, and DMRSs corresponding to first first TOs in at least two adjacent periods in the first configuration are different.

In a fifth aspect, a terminal is further provided in the embodiments of the present disclosure. The terminal includes: an obtaining module, configured for obtaining configuration information of a first configuration of a physical uplink shared channel or a physical downlink shared channel; a determination module, configured for determining Redundancy Versions (RV) corresponding to Transmission Occasions (TO) in a second configuration of the physical uplink shared channel or the physical downlink shared channel according to the configuration information, wherein, RVs corresponding to TOs overlapped in time domain in the first configuration and in the second configuration are the same; a transmission module, configured for transmitting the physical uplink shared channel or the physical downlink shared channel according to the RVs.

In a seventh aspect, a computer-readable storage medium is further provided in the embodiments of the present disclosure. The storage medium includes a computer program stored on the computer-readable storage medium, wherein when the computer program is executed by a processor, the processor implements steps of the information transmission method.

The above-described technical solutions of the present disclosure have following beneficial effects: the RVs corresponding to the TOs in the second configuration of the physical uplink shared channel or the physical downlink shared channel are determined by the configuration information of the first configuration of the physical uplink shared channel or the physical downlink shared channel, and RVs corresponding to TOs overlapped in time domain in the first configuration and in the second configuration are the same, and therefore, the physical uplink shared channel or the physical downlink shared channel is transmitted according to the determined RV. In this way, according to the configuration information of the first configuration, the RVs corresponding to the TOs in the second configuration can be determined, so that consumption of frequency-domain resources or DMRSs caused by blind detection can be avoided, and a resource efficiency can be improved.

BRIEF DESCRIPTION OF THE DRAWINGS

In order to more clearly explain technical solutions of the embodiments of the present disclosure, drawings required in description of the embodiments of the present disclosure will be introduced briefly hereinafter. It is obvious that the drawings in the following description are only a few embodiments of the present disclosure, and other drawings may be obtained by those of ordinary skills in the art from the drawings without paying creative labor.

DETAILED DESCRIPTION

Figure 1:
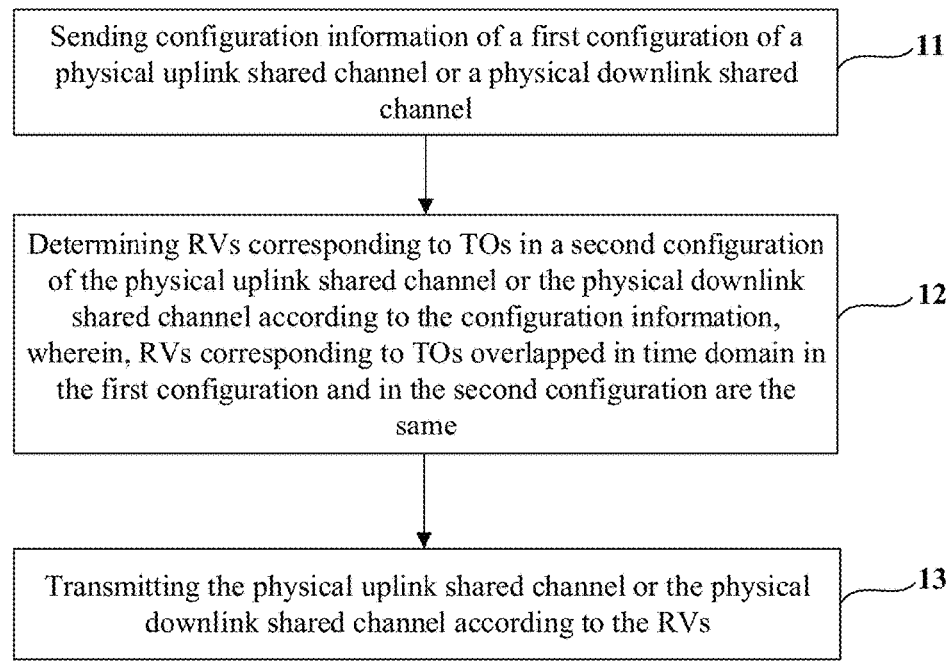
FIG. 1 is a first flowchart of an information transmission method at a network device side according to an embodiment of the present disclosure.

In order to make technical problems to be solved by the present disclosure, technical solutions, and advantages more clear, a detailed description of drawings and specific embodiments will be given below. In the following description, specific details, such as specific configurations and components, are provided merely to facilitate thorough understanding of the embodiments of the present disclosure. Accordingly, it will be apparent to those skilled in the art that various changes and modifications may be made to the embodiments described herein without departing from the scope and the spirit of the present disclosure. In addition, description of known functions and configurations are omitted for clarity and conciseness.

It should be noted that reference to "one embodiment" or "an embodiment" throughout the specification means that particular features, structures, or characteristics associated with an embodiment are included in at least one embodiment of the present disclosure. Accordingly, reference to "in one embodiment" or "in an embodiment" throughout the specification do not necessarily refer to the same embodiment. Furthermore, these particular features, structures, or characteristics may be combined in any suitable manner in one or more embodiments.

In various embodiments of the present disclosure, it should be understood that values of sequence numbers of the following processes do not imply an order of execution, the order of execution of the processes should be determined by their functions and inherent logic, and should not be construed as any limitation on any implementation process of the embodiments of the present disclosure.

In addition, such terms as "system" and "network" herein are often used interchangeably herein.

In the embodiments provided herein, it should be understood that "B corresponding to A" means that B is associated with A and B can be determined from A. However, it should also be understood that determining B from A does not mean that B is determined from A only, but B may also be determined from A and/or other information.

In the embodiments of the present disclosure, forms of access networks are not limited, may be access networks including a Macro Base Station, a Pico Base Station, a Node B (referred to as a 3G mobile network device), an enhanced network device (eNB), a home enhanced base station (Femto eNB or Home eNode B or Home eNB or HeNB), a relay station, an access point, a RRU (Remote Radio Unit), a RRH (Remote Radio Head), etc. A user equipment may be a mobile telephone (or a handset) or other device capable of sending or receiving radio signals, including a User Equipment (UE), a Personal Digital Assistant (PDA), a wireless modem, a wireless communication device, a handheld device, a laptop computer, a cordless telephone, a Wireless Local Loop (WLL) station, a Customer Premise Equipment (CPE) capable of converting a mobile signal into a WiFi signal, a mobile smart hotspot, a smart home appliance, or other devices capable of communicating with a mobile communication network spontaneously without human operation.

In particular, embodiments of the present disclosure provide an information transmission method. The information transmission method solves the problem that a low resource efficiency is introduced by determining RVs corresponding to TOs of configurations in a multi-configuration transmission scheme.

As shown in FIG. 1, an embodiment of the present disclosure provides an information transmission method. Specifically, the information transmission method includes the following steps 11-13.

Step 11: sending configuration information of a first configuration of a physical uplink shared channel or a physical downlink shared channel.

The configuration information of the first configuration may include: information such as a period P of resource allocation, the number K of repetitions, an RV sequence, and locations of K resources in the period P, where the locations of the K resources become K transmission occasions (TO).

Step 12: determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same.

The second configuration is at least one or at least two of multiple configurations transmitting the physical uplink shared channel or the physical downlink shared channel. For example, the first configuration is one of the multiple configurations, the second configuration is at least one of the multiple configurations; the first configuration is not one of the multiple configurations, the second configuration is at least two of the multiple configurations.

Step 13: transmitting the physical uplink shared channel or the physical downlink shared channel according to the RVs.

In the above technical solution, the RVs corresponding to the TOs in the second configuration of the physical uplink shared channel or the physical downlink shared channel are determined by the configuration information of the first configuration of the physical uplink shared channel or the physical downlink shared channel, and RVs corresponding to TOs overlapped in time domain in the first configuration and in the second configuration are the same, and therefore, the physical uplink shared channel or the physical downlink shared channel is transmitted according to the determined RV. In this way, according to the configuration information of the first configuration, the RVs corresponding to the TOs in the second configuration can be determined, so that consumption of frequency-domain resources or DMRSs caused by blind detection can be avoided, and a resource efficiency can be improved.

For transmission of the physical uplink shared channel, the method specifically includes: sending the configuration information of the first configuration of the physical uplink shared channel; determining Redundancy Versions (RVs) corresponding to Transmission Occasions (TOs) in the second configuration of the physical uplink shared channel according to the configuration information, wherein, RVs corresponding to TOs overlapped in time domain in the first configuration and in the second configuration are the same; receiving the physical uplink shared channel according to the RVs.

For transmission of the physical downlink shared channel, the method specifically includes: sending the configuration information of the first configuration of the physical downlink shared channel; determining Redundancy Versions (RVs) corresponding to Transmission Occasions (TOs) in the second configuration of the physical downlink shared channel according to the configuration information, wherein, RVs corresponding to TOs overlapped in time domain in the first configuration and in the second configuration are the same; sending the physical downlink shared channel according to the RVs.

Optionally, the step 12 may specifically include: determining an RV corresponding to a first TO in the first configuration according to the configuration information; determining, according to the RV corresponding to the first TO, an RV corresponding to a second TO, in the second configuration, overlapping with the first TO in time domain.

In particular, an RV corresponding to each first TO in the first configuration is determined according to the configuration information, and for each second TO in the second configuration, the RV corresponding to the second TO is determined according to the RV corresponding to the first TO overlapping with the second TO in a one-to-one correspondence in time domain.

Optionally, the first configuration may be a configuration in which a time instant corresponding to the first TO is the earliest, among the multiple configurations for transmitting the physical uplink shared channel or the physical downlink shared channel, to ensure that the RV corresponding to each TO in the second configuration can be determined according to the configuration information of the first configuration.

Optionally, the above method of determining the RVs corresponding to the TOs in the second configuration may also be implemented in the following manner: in case that a RV sequence corresponding to the first configuration is the same as a RV sequence corresponding to the second configuration, determining an RV corresponding to a first second TO in the second configuration, according to a RV corresponding to the first TO in the first configuration overlapping with the first second TO in time domain; determining RVs corresponding to second TOs in the second configuration, based on the RV corresponding to the first second TO and the RV sequence.

It should be noted that, in addition to the given method of determining the RVs corresponding to the TOs in the second configuration according to the configuration information of the first configuration, other implementations may be adopted. The present disclosure is not limited thereto as long as it is ensured that RVs corresponding to TOs overlapped in time domain in the first configuration and in the second configuration are the same.

The above method is described below in combination with specific examples.

Table 1 below shows transmission schemes corresponding to different RV configurations for different repetitive transmission times K configured in the URLLC uplink scheduling-free transmission scheme.

TABLE 1

|   | RV = {0 0 0 0} | RV = {0 3 0 3} | RV = {0 2 3 1} |
|---|---|---|---|
| K = 1 | {0} | {0} | {0} |
| K = 2 | {0 0} if start from $1^{st}$ TO<br>{0} if start from $2^{nd}$ TO | {0 3} always start from $1^{st}$ TO | {0 2} always start from $1^{st}$ TO |
| K = 4 | {0 0 0 0} if start from $1^{st}$ TO<br>{0 0 0} if start from $2^{nd}$ TO<br>{0 0} if start from $3^{rd}$ TO<br>{0} if start from $4^{th}$ TO | {0 3 0 3} if start from $1^{st}$ TO<br>{0 3} if start from $3^{rd}$ TO | {0 2 3 1} always start from $1^{st}$ TO |

TABLE 1-continued

| | RV = {0 0 0 0} | RV = {0 3 0 3} | RV = {0 2 3 1} |
|---|---|---|---|
| K = 8 | {0 0 0 0 0 0 0 0} if start from $1^{st}$ TO | {0 3 0 3 0 3 0 3} if start from $1^{st}$ TO | {0 2 3 1 0 2 3 1} always start from $1^{st}$ TO |
| | {0 0 0 0 0 0 0} if start from $2^{nd}$ TO | | |
| | {0 0 0 0 0 0} if start from $3^{rd}$ TO | {0 3 0 3 0 3} if start from $3^{rd}$ TO | |
| | {0 0 0 0 0} if start from $4^{th}$ TO | | |
| | {0 0 0 0} if start from $5^{th}$ TO | {0 3 0 3} if start from $5^{th}$ TO | |
| | {0 0 0} if start from $6^{th}$ TO | | |
| | {0 0} if start from $7^{th}$ TO | {0 3} if start from $7^{th}$ TO | |

In Table 1, P=K=4, RV={0 2 3 1} is taken as an example, where elements 0, 1, 2, and 3 in the RV sequence represent different transmission schemes, and time-domain resource position is {start time-domain symbol, the number of time-domain symbols}, for example, the time-domain symbol is an OFDM symbol, and the time-domain resource location is one transmission occasion.

Figure 2:
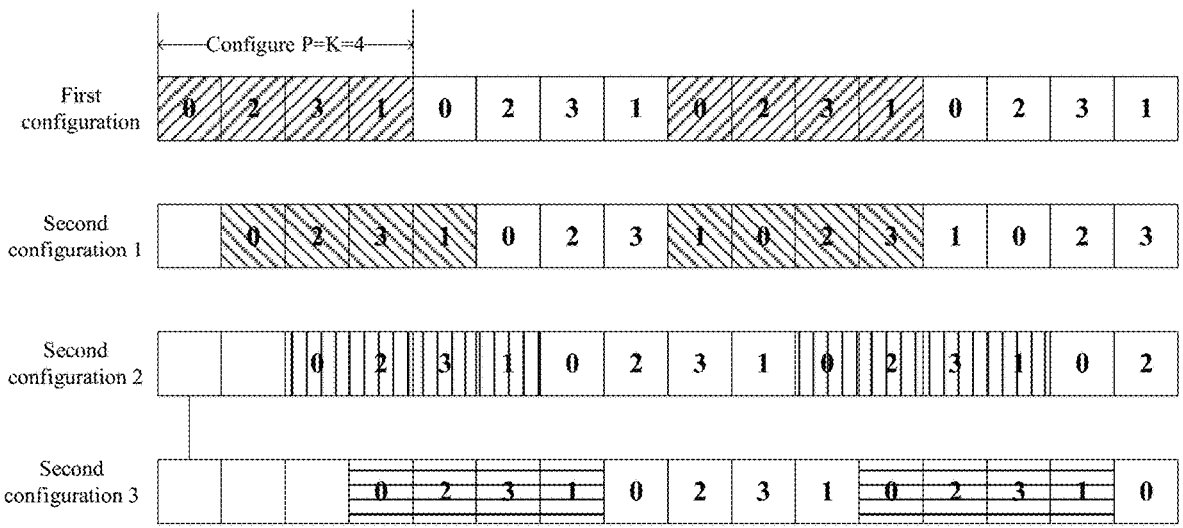
FIG. 2 is a schematic diagram showing RVs corresponding to transmission occasions of a first configuration and a second configuration according to an embodiment of the present disclosure.

As shown in FIG. 2, RVs of second TOs in a second configuration 1, a second configuration 2, and a second configuration 3 are determined according to RVs corresponding to the first TOs in the first configuration, where the first configuration and the second configurations may be configurations of a Configuration Grant (CG).

Specifically, the network device configures the RV sequence of the first configuration as {0 2 3 1} and transmission resources through a RRC signaling. In FIG. 2, one continuous shadow area or one continuous blank area after the shadow area corresponds to one period, and each period has four transmission resources (i.e., transmission occasions), the RVs corresponding to the transmission occasions are 0, 2, 3, 1, respectively.

A period boundary of the second configuration 1 is delayed relative to a period boundary of the first configuration by a time length of one transmission resource, a period boundary of the second configuration 2 is delayed relative to the period boundary of the first configuration by a time length of two transmission resources, a period boundary of the second configuration 3 is delayed relative to the period boundary of the first configuration by a time length of three transmission resources.

First to third transmission resources of the second configuration 1 are overlapped with second to fourth transmission resources of the first configuration in one period in time domain.

That is, the first transmission resource of the second configuration 1 overlaps with the second transmission resource of the first configuration in time domain, then it is determined that the RV corresponding to the first transmission resource of the second configuration is 2; the second transmission resource of the second configuration 1 overlaps with the third transmission resource of the first configuration in time domain, then it is determined that the RV corresponding to the second transmission resource of the second configuration 1 is 3; the third transmission resource of the second configuration 1 overlaps with the fourth transmission resource of the first configuration in time domain, then it is determined that the RV corresponding to the third transmission resource of the second configuration 1 is 1; the fourth transmission resource of the second configuration 1 overlaps with the first transmission resource of the first configuration 1 in a next period in time domain, then it is determined that the RV corresponding to the fourth transmission resource of the second configuration 1 is 0; and an RV corresponding to each transmission resource in the second configuration 1 is determined by analogy.

Further, methods of determining the RV corresponding to each transmission resource in the second configuration 2 and the second configuration 3 are similar to the above method, and are not repeated here.

Figure 3:
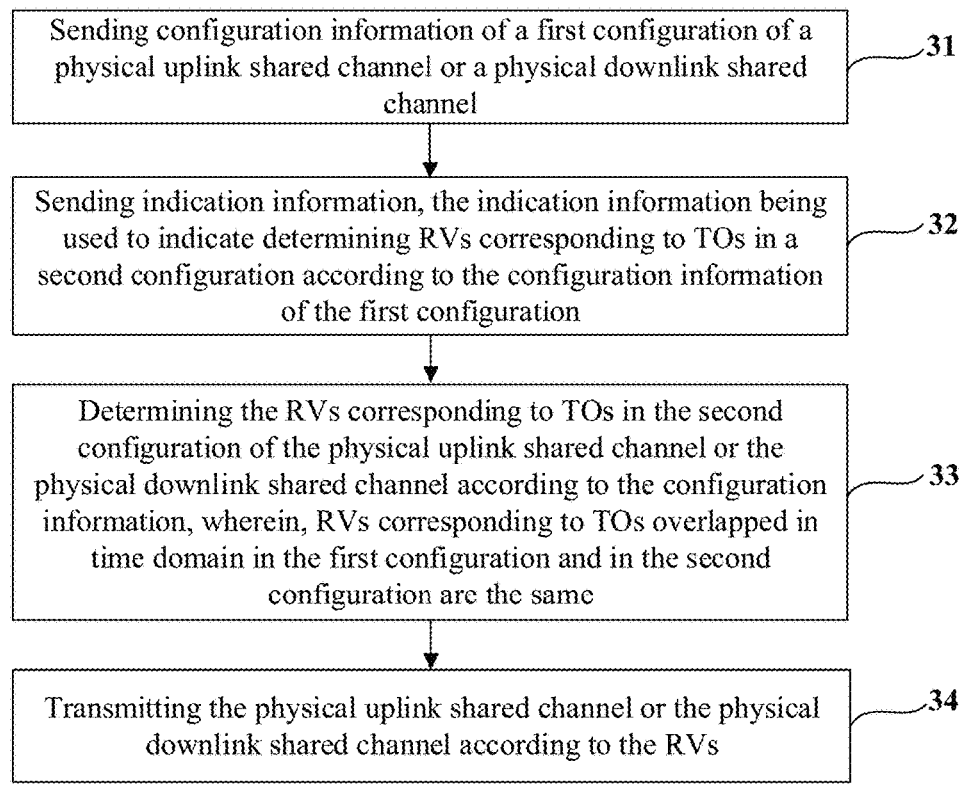
FIG. 3 is a second flowchart of an information transmission method at the network device side according to an embodiment of the present disclosure.

As shown in FIG. 3, the embodiments of the present disclosure also provide an information transmission method. The information transmission method includes steps 31-34.

Step 31: sending configuration information of a first configuration of a physical uplink shared channel or a physical downlink shared channel.

Step 32: sending indication information, the indication information being used to indicate determining Redundancy Versions (RVs) corresponding to Transmission Occasions (TOs) in a second configuration according to the configuration information of the first configuration.

Optionally, the indication information may be carried in a Radio Resource Control (RRC) signaling.

As one implementation, the indication information may include a first numbering value, wherein, in multiple configurations for transmitting a physical uplink shared channel or a physical downlink shared channel, one configuration corresponds to one numbering value, and a configuration corresponding to the first numbering value is determined as the first configuration.

As another implementation, the indication information may be used to indicate that configuration in which the time instant corresponding to the first TO in the multiple configurations for transmitting the physical uplink shared channel or the physical downlink shared channel is the earliest is the first configuration.

Step 33: determining the RVs corresponding to TOs in the second configuration of the physical uplink shared channel or the physical downlink shared channel according to the configuration information, wherein, RVs corresponding to TOs overlapped in time domain in the first configuration and in the second configuration are the same.

Step 34: transmitting the physical uplink shared channel or the physical downlink shared channel according to the RVs It should be noted that the above step 32 may be executed before the above step 31, or the above step 31 and the above step 32 may be executed simultaneously, and the present disclosure is not limited thereto.

In the above technical solution, the RVs corresponding to the TOs in the second configuration of the physical uplink shared channel or the physical downlink shared channel are determined by the configuration information of the first configuration of the physical uplink shared channel or the physical downlink shared channel, and RVs corresponding to TOs overlapped in time domain in the first configuration and in the second configuration are the same, and therefore, the physical uplink shared channel or the physical downlink shared channel is transmitted according to the determined RV. In this way, according to the configuration information of the first configuration, the RVs corresponding to the TOs in the second configuration can be determined, so that consumption of frequency-domain resources or DMRSs caused by blind detection can be avoided, and a resource efficiency can be improved.

Further, as an implementation, DeModulation Reference Signals (DMRSs) corresponding to the first TO and the second TO overlapped in time domain are the same.

The DMRSs corresponding to first TOs in one period in the first configuration are the same, and the DMRSs corresponding to the first one of first TOs and the first one of first TOs in at least two adjacent periods in the first configuration are different.

Figure 4:
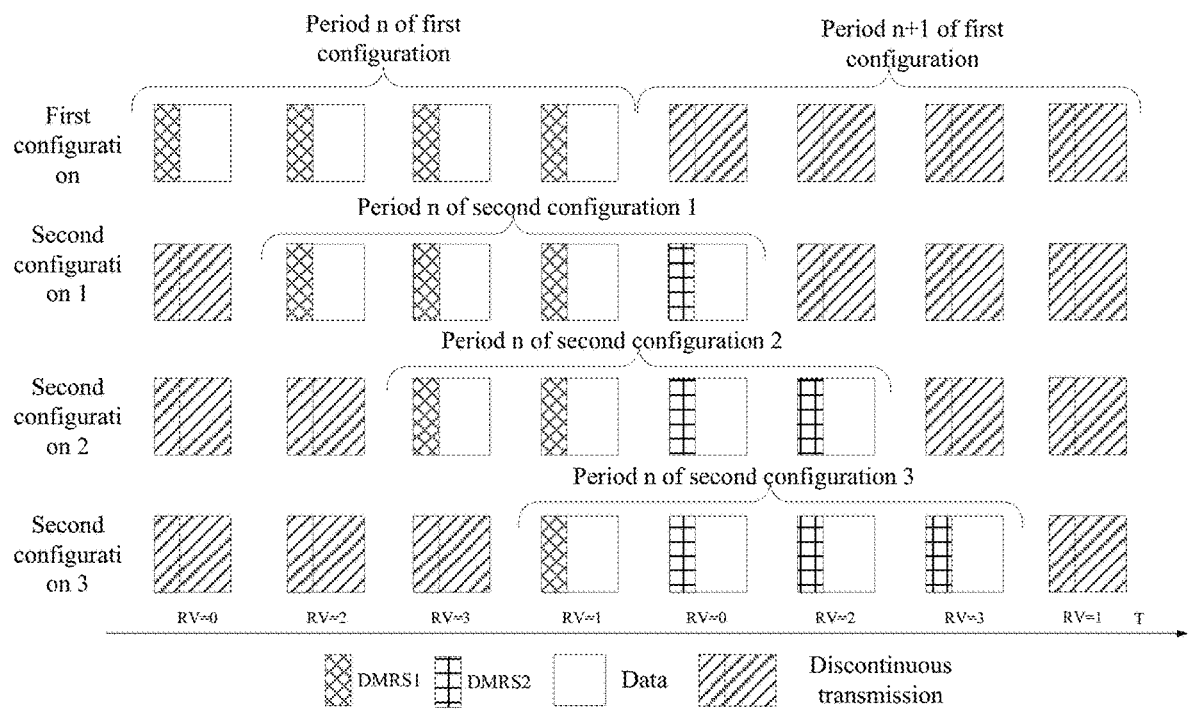
FIG. 4 is a first schematic diagram of DMRSs corresponding to each transmission occasion of the first configuration and the second configuration according to an embodiment of the present disclosure.

As shown in FIG. 4, an example of a DMRS corresponding to a transmission occasion is given. In this example, the first configuration, the second configuration 1, the second configuration 2, and the second configuration 3 are four kinds of configurations, in which a period of each configuration is P. In each period, 4 transmission occasions are configured to support 4 repetitive transmissions, and a starting position of a period of each configuration is shown in FIG. 4.

A RV on any transmission occasion of any of the second configurations must be the same as a RV on a transmission occasion, at the same time instant as the any transmission occasion of the second configuration, of the first configuration (as described in the above embodiment which is not repeated here). After crossing a boundary of a period of the first configuration, a DMRS configuration changes on transmission occasions of both the first configuration and any of the second configurations.

For example, taking the second configuration 1 as an example, first to third transmission occasions within a period n of the second configuration 1 overlap with second to fourth transmission occasions in the period n of the first configuration in time domain; a fourth transmission occasion in the period n of the second configuration 1 overlaps with a first transmission occasion in a period n+1 of the first configuration in time domain. The first to third transmission occasions in the period n of the second configuration 1 correspond to DMRS1, and the fourth transmission occasion in the period n of the second configuration 1 corresponds to DMRS2.

As another implementation, the DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

The DMRSs corresponding to first TOs in one period in the first configuration are the same, and the DMRSs corresponding to first first TOs in at least two adjacent periods in the first configuration are different; or, the DMRSs corresponding to the first TOs in one period in the first configuration are the same, and the DMRSs correspond to Hybrid Automatic Repeat reQuest (HARQ) process numbers of transmissions in the period in a one-to-one manner, and DMRSs corresponding to different HARQ process numbers are different.

Figure 5:
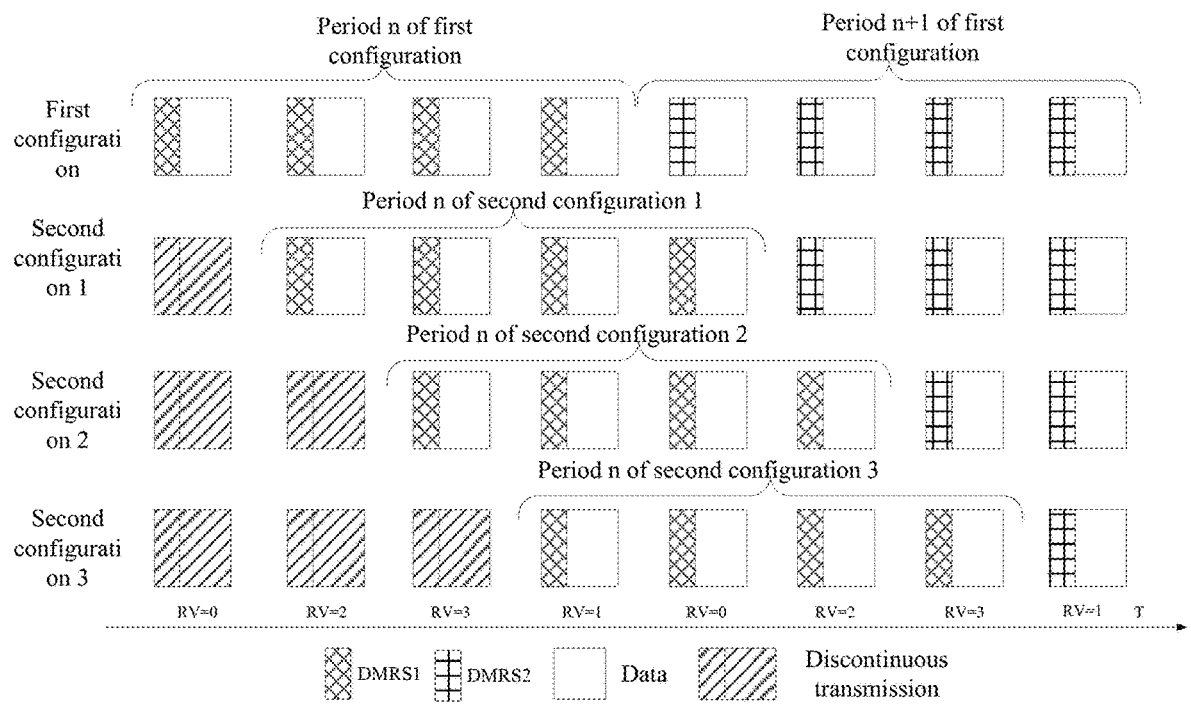
FIG. 5 is a second schematic diagram of DMRSs corresponding to transmission occasions of the first configuration and the second configuration according to an embodiment of the present disclosure.

As shown in FIG. 5, an example of a DMRS corresponding to a transmission occasion is given. In this example, the first configuration, the second configuration 1, the second configuration 2, and the second configuration 3 are four kinds of configurations, in which a period of each configuration is P. In each period, 4 transmission occasions are configured to support 4 repetitive transmissions, and a starting position of a period of each configuration is shown in FIG. 5.

A RV on any transmission occasion of any of the second configurations must be the same as a RV on a transmission occasion, at the same time instant as the any transmission occasion of the second configuration, of the first configuration (as described in the above embodiment which is not repeated here).

For example, taking the second configuration 1 as an example, first to third transmission occasions within a period n of the second configuration 1 overlap with second to fourth transmission occasions in the period n of the first configuration in time domain; a fourth transmission occasion in the period n of the second configuration 1 overlaps with a first transmission occasion in a period n+1 of the first configuration in time domain. The transmission occasions in the period n of the second configuration 1 correspond to DMRS1, and the transmission occasions in the period n+1 of the second configuration 1 corresponds to DMRS2.

The information transmission method at a network device side of the present disclosure is described above, and a corresponding network device will be further described in the following embodiment with reference to the drawings.

Figure 6:
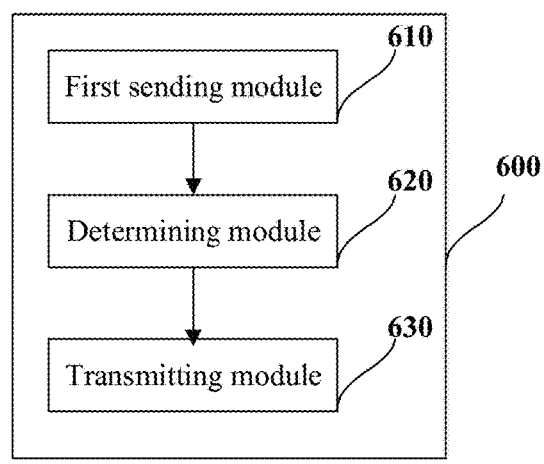
FIG. 6 is a block diagram of a network device according to an embodiment of the present disclosure.

Specifically, as shown in FIG. 6, embodiments of the present disclosure further provide a network device 600. The network device 600 includes a first sending module 610, a determining module 620, and a transmitting module 630.

The first sending module 610 is configured for sending configuration information of a first configuration of a physical uplink shared channel or a physical downlink shared channel.

The determining module 620 is configured for determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same.

The transmitting module 630 is configured for transmitting the physical uplink shared channel or the physical downlink shared channel according to the RVs.

Optionally, the determining module 620 includes a first determining unit and a second determining unit.

The first determining unit is configured for determining an RV corresponding to a first TO in the first configuration according to the configuration information. The second determining unit is configured for determining, according to the RV corresponding to the first TO, an RV corresponding to a second TO, in the second configuration, overlapping with the first TO in time domain.

Optionally, the network device 600 further includes a second sending module configured for sending indication information, the indication information being used to indicate determining Redundancy Versions (RVs) corresponding to Transmission Occasions (TOs) in a second configuration according to the configuration information of the first configuration.

Optionally, DeModulation Reference Signals (DMRSs) corresponding to the first TO and the second TO overlapped in time domain are the same.

Optionally, the DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

Optionally, the DMRSs corresponding to first TOs in one period in the first configuration are the same, and the DMRSs corresponding to first first TOs in at least two adjacent periods in the first configuration are different.

The embodiment of the network device of the present disclosure corresponds to the embodiment of the method by the network device, and all the implementations in the embodiment of the method are applicable to the embodiment of the network device, and the same technical effect can be achieved.

The network device 600 in the embodiment of the present disclosure determines the RVs corresponding to the TOs in the second configuration of the physical uplink shared channel or the physical downlink shared channel according to the configuration information of the first configuration of the physical uplink shared channel or the physical downlink shared channel, and RVs corresponding to TOs overlapped in time domain in the first configuration and in the second configuration are the same, and therefore, the physical uplink shared channel or the physical downlink shared channel is transmitted according to the determined RV. In this way, according to the configuration information of the first configuration, the RVs corresponding to the TOs in the second configuration can be determined, so that consumption of frequency-domain resources or DMRSs caused by blind detection can be avoided, and a resource efficiency can be improved.

Figure 7:
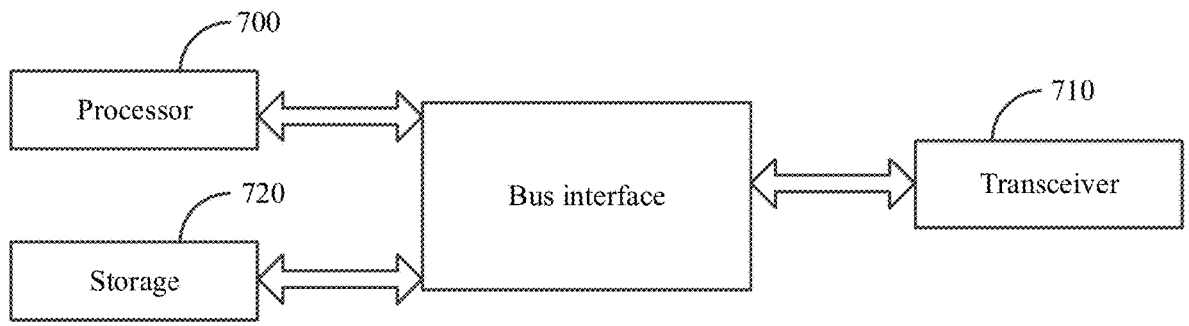
FIG. 7 is a block diagram showing a structure of a network device according to the present disclosure.

To better achieve the above objective, as shown in FIG. 7, the present disclosure also provides a network device. The network device includes a processor 700, a storage 720 connected to the processor 700 through a bus interface, and a transceiver 710 connected to the processor 700 through a bus interface. The storage 720 is configured for storing programs and data used by the processor when performing operations; data information or a pilot is transmitted through the transceiver 710 and an uplink control channel is also received through the transceiver 710; when the processor 700 calls and executes the programs and data stored in the storage 720, the processor 700 implements the following functions.

The processor 700 is configured to read the program in the storage 720 and perform the following steps: sending configuration information of a first configuration of a physical uplink shared channel or a physical downlink shared channel; determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same; and transmitting the physical uplink shared channel or the physical downlink shared channel according to the RVs The processor 720 further implements the following steps when executing the computer program: determining an RV corresponding to a first TO in the first configuration according to the configuration information; determining, according to the RV corresponding to the first TO, an RV corresponding to a second TO, in the second configuration, overlapping with the first TO in time domain.

The processor 720 further implements the following steps when executing the computer program: sending indication information, the indication information being used to indicate determining Redundancy Versions (RVs) corresponding to Transmission Occasions (TOs) in a second configuration according to the configuration information of the first configuration.

DeModulation Reference Signals (DMRSs) corresponding to the first TO and the second TO overlapped in time domain are the same.

The DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

The DMRSs corresponding to first TOs in one period in the first configuration are the same, and the DMRSs corresponding to first first TOs in at least two adjacent periods in the first configuration are different.

The transceiver 710 is configured for receiving and transmitting data under the control of the processor 700.

In FIG. 7, a bus architecture may include any number of interconnected buses and bridges. Specifically, various circuits such as one or more processors represented by the processor 700 and a storage represented by the storage 720 are linked together. The bus architecture may also link together various other circuits, such as peripherals, voltage regulators, and power management circuits, all of which are well known in the art and thus will not be described further herein. The bus interface provides an interface. The transceiver 710 may be a plurality of elements, i.e., including a transmitter and a receiving, for providing means for communicating with various other devices over a transmission medium. The processor 700 is responsible for managing the bus architecture and general processing, and the storage 720 may store data used by the processor 700 when the processor 700 performs operations.

It will be understood by those skilled in the art that all or part of the steps for implementing the above-described embodiments may be performed by hardware, or may be performed by a computer program indicating relevant hardware, the computer program includes instructions for performing part or all of the steps of the above method; and the computer program may be stored in a readable storage medium, which may be any form of storage medium.

An embodiment of the present disclosure also provides a computer-readable storage medium. The computer-readable storage medium having stored thereon a computer program. When the computer program is executed by a processor, each process of the embodiment of the information transmission method can be implemented, and the same technical effect can be achieved, which is not repeated here. The computer-readable storage medium is such as a Read-Only Memory (ROM), a Random Access Memory (RAM), a magnetic disk, or optical disk, etc.

The information transmission method of the embodiment of the present disclosure is described above from the network device side, and the information transmission method at a terminal side will be further described below with reference to the drawings.

Figure 8:
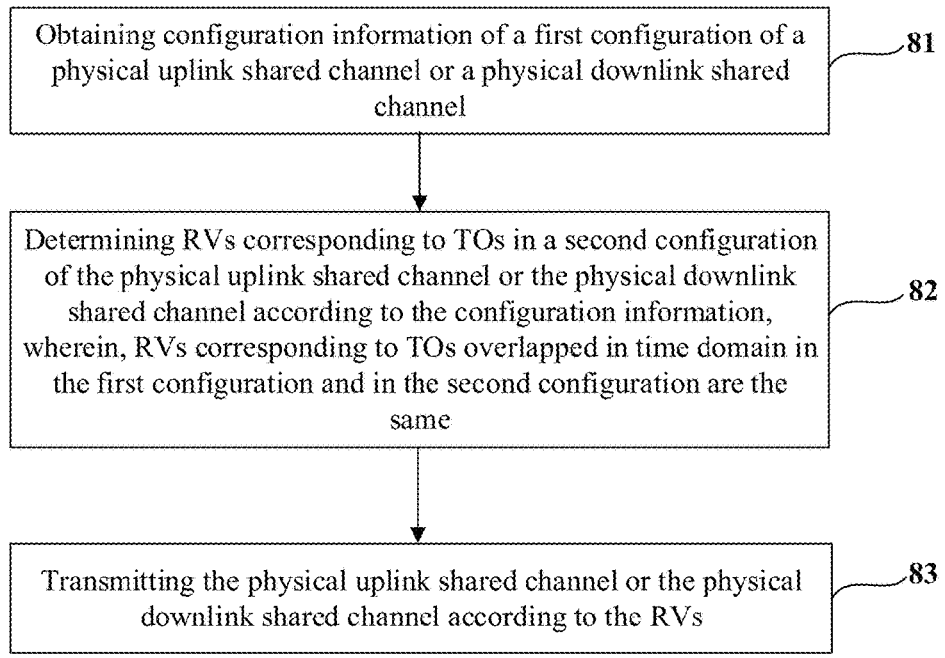
FIG. 8 is a first flowchart of an information transmission method at a terminal side according to an embodiment of the present disclosure.

As shown in FIG. 8, an embodiment of the present disclosure provides an information transmission method. The information transmission method includes steps 81-83.

Step 81: obtaining configuration information of a first configuration of a physical uplink shared channel or a physical downlink shared channel.

The configuration information of the first configuration may include: information such as a period P of resource allocation, the number K of repetitions, an RV sequence, and locations of K resources in the period P, where the locations of the K resources become K transmission occasions (TO).

Step 82: determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same.

The second configuration is at least one or at least two of multiple configurations transmitting the physical uplink shared channel or the physical downlink shared channel. For example, the first configuration is one of the multiple configurations, the second configuration is at least one of the multiple configurations; the first configuration is not one of the multiple configurations, the second configuration is at least two of the multiple configurations.

Step 83: transmitting the physical uplink shared channel or the physical downlink shared channel according to the RVs.

In the above technical solution, the RVs corresponding to the TOs in the second configuration of the physical uplink shared channel or the physical downlink shared channel are determined according to the configuration information of the first configuration of the physical uplink shared channel or the physical downlink shared channel, and RVs corresponding to TOs overlapped in time domain in the first configuration and in the second configuration are the same. In this way, RVs corresponding to the ROs in the second configuration may be determined according to the configuration information of the first configuration, and further, the physical uplink shared channel or the physical downlink shared channel is transmitted according to the determined RV. Consumption of frequency-domain resources or DMRSs caused by blind detection can be avoided, and a resource efficiency can be improved.

For transmission of the physical uplink shared channel, the method specifically includes: obtaining the configuration information of the first configuration of the physical uplink shared channel; determining Redundancy Versions (RVs) corresponding to Transmission Occasions (TOs) in the second configuration of the physical uplink shared channel according to the configuration information, wherein, RVs corresponding to TOs overlapped in time domain in the first configuration and in the second configuration are the same; sending the physical uplink shared channel according to the RVs.

For transmission of the physical downlink shared channel, the method specifically includes: obtaining the configuration information of the first configuration of the physical downlink shared channel; determining Redundancy Versions (RVs) corresponding to Transmission Occasions (TOs) in the second configuration of the physical downlink shared channel according to the configuration information, wherein, RVs corresponding to TOs overlapped in time domain in the first configuration and in the second configuration are the same; receiving the physical downlink shared channel according to the RVs.

Optionally, the step 82 may specifically include: determining an RV corresponding to a first TO in the first configuration according to the configuration information; determining, according to the RV corresponding to the first TO, an RV corresponding to a second TO, in the second configuration, overlapping with the first TO in time domain.

In particular, an RV corresponding to each first TO in the first configuration is determined according to the configuration information, and for each second TO in the second configuration, the RV corresponding to the second TO is determined according to the RV corresponding to the first TO overlapping with the second TO in a one-to-one correspondence in time domain.

Optionally, the first configuration may be a configuration in which a time instant corresponding to the first TO is the earliest, among the multiple configurations for transmitting the physical uplink shared channel or the physical downlink shared channel, to ensure that the RV corresponding to each TO in the second configuration can be determined according to the configuration information of the first configuration.

Optionally, the above method of determining the RVs corresponding to the TOs in the second configuration may also be implemented in the following manner: in case that a RV sequence corresponding to the first configuration is the same as a RV sequence corresponding to the second configuration, determining an RV corresponding to a first second TO in the second configuration, according to a RV corresponding to the first TO in the first configuration overlapping with the first second TO in time domain; determining RVs corresponding to second TOs in the second configuration, based on the RV corresponding to the first second TO and the RV sequence.

It should be noted that, in addition to the given method of determining the RVs corresponding to the TOs in the second configuration according to the configuration information of the first configuration, other implementations may be adopted. The present disclosure is not limited thereto as long as it is ensured that RVs corresponding to TOs overlapped in time domain in the first configuration and in the second configuration are the same.

The above method is described below in combination with specific examples.

As shown in FIG. 2, RVs of second TOs in a second configuration 1, a second configuration 2, and a second configuration 3 are determined according to RVs corresponding to the first TOs in the first configuration, where the first configuration and the second configurations may be configurations of a Configuration Grant (CG).

Specifically, the network device configures the RV sequence of the first configuration as {0 2 3 1} and transmission resources through a RRC signaling. In FIG. 2, one continuous shadow area or one continuous blank area after the shadow area corresponds to one period, and each period has four transmission resources (i.e., transmission occasions), the RVs corresponding to the transmission occasions are 0, 2, 3, 1, respectively.

A period boundary of the second configuration 1 is delayed relative to a period boundary of the first configuration by a time length of one transmission resource, a period boundary of the second configuration 2 is delayed relative to the period boundary of the first configuration by a time length of two transmission resources, a period boundary of the second configuration 3 is delayed relative to the period boundary of the first configuration by a time length of three transmission resources.

First to third transmission resources of the second configuration 1 are overlapped with second to fourth transmission resources of the first configuration in one period in time domain.

That is, the first transmission resource of the second configuration 1 overlaps with the second transmission resource of the first configuration in time domain, then it is determined that the RV corresponding to the first transmission resource of the second configuration is 2; the second transmission resource of the second configuration 1 overlaps with the third transmission resource of the first configuration in time domain, then it is determined that the RV corresponding to the second transmission resource of the second configuration 1 is 3; the third transmission resource of the second configuration 1 overlaps with the fourth transmission resource of the first configuration in time domain, then it is determined that the RV corresponding to the third transmission resource of the second configuration 1 is 1; the fourth transmission resource of the second configuration 1 overlaps with the first transmission resource of the first configuration 1 in a next period in time domain, then it is determined that the RV corresponding to the fourth transmission resource of the second configuration 1 is 0; and an RV corresponding to each transmission resource in the second configuration 1 is determined by analogy.

Further, methods of determining the RV corresponding to each transmission resource in the second configuration 2 and the second configuration 3 are similar to the above method, and are not repeated here.

Figure 9:
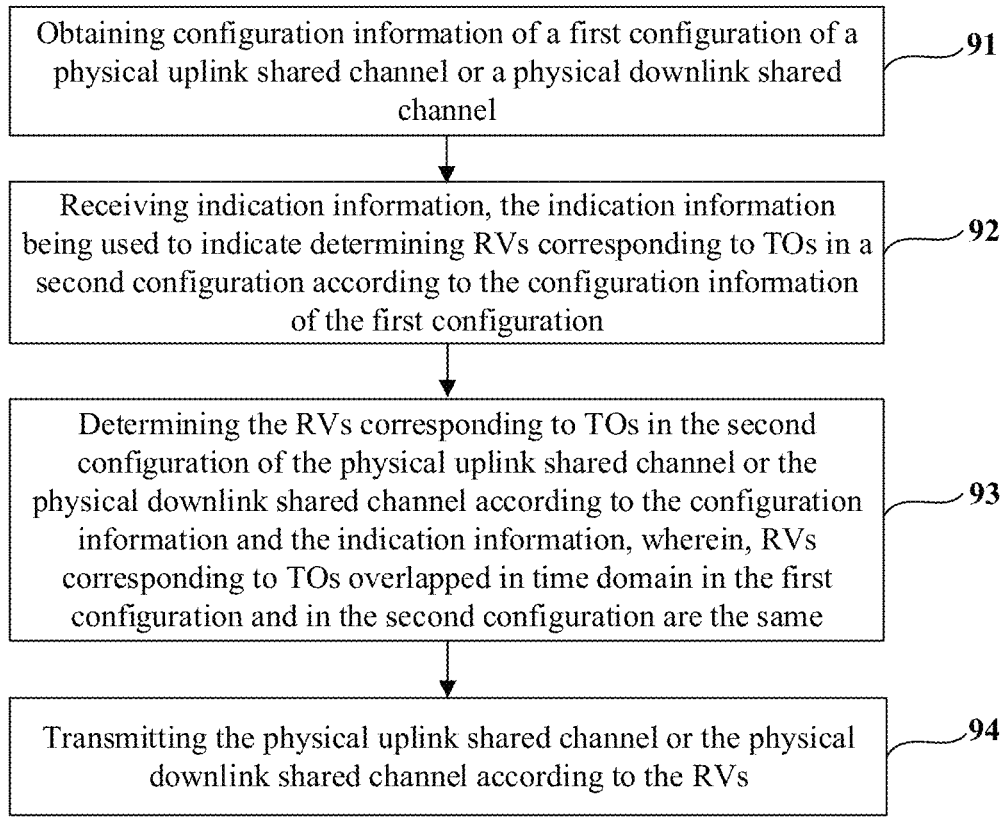
FIG. 9 is a second flowchart of an information transmission method at a terminal side according to an embodiment of the present disclosure.

As shown in FIG. 9, an embodiment of the present disclosure further provides an information transmission method, and the method includes steps 91-94.

Step 91: obtaining configuration information of a first configuration of a physical uplink shared channel or a physical downlink shared channel.

Step 92: receiving indication information, the indication information being used to indicate determining Redundancy Versions (RVs) corresponding to Transmission Occasions (TOs) in a second configuration according to the configuration information of the first configuration.

Optionally, the indication information may be carried in a Radio Resource Control (RRC) signaling.

As one implementation, the indication information may include a first numbering value, wherein, in multiple configurations for transmitting a physical uplink shared channel or a physical downlink shared channel, one configuration corresponds to one numbering value, and a configuration corresponding to the first numbering value is determined as the first configuration.

As another implementation, the indication information may be used to indicate that configuration in which the time instant corresponding to the first TO in the multiple configurations for transmitting the physical uplink shared channel or the physical downlink shared channel is the earliest is the first configuration.

Step 93: determining the RVs corresponding to TOs in the second configuration of the physical uplink shared channel or the physical downlink shared channel according to the configuration information and the indication information, wherein, RVs corresponding to TOs overlapped in time domain in the first configuration and in the second configuration are the same.

Step 94: transmitting the physical uplink shared channel or the physical downlink shared channel according to the RVs In the above technical solution, the RVs corresponding to the TOs in the second configuration of the physical uplink shared channel or the physical downlink shared channel are determined according to the configuration information, sent by the network device, of the first configuration of the physical uplink shared channel or the physical downlink shared channel, and RVs corresponding to TOs overlapped in time domain in the first configuration and in the second configuration are the same. In this way, according to the configuration information of the first configuration, the RVs corresponding to the TOs in the second configuration can be determined, and therefore, the physical uplink shared channel or the physical downlink shared channel is transmitted according to the determined RV, so that consumption of frequency-domain resources or DMRSs caused by blind detection can be avoided, and a resource efficiency can be improved.

Further, as an implementation, DeModulation Reference Signals (DMRSs) corresponding to the first TO and the second TO overlapped in time domain are the same.

The DMRSs corresponding to first TOs in one period in the first configuration are the same, and the DMRSs corresponding to the first one of first TOs and the first one of first TOs in at least two adjacent periods in the first configuration are different.

As shown in FIG. 4, an example of a DMRS corresponding to a transmission occasion is given. In this example, the first configuration, the second configuration 1, the second configuration 2, and the second configuration 3 are four kinds of configurations, in which a period of each configuration is P. In each period, 4 transmission occasions are configured to support 4 repetitive transmissions, and a starting position of a period of each configuration is shown in FIG. 4.

A RV on any transmission occasion of any of the second configurations must be the same as a RV on a transmission occasion, at the same time instant as the any transmission occasion of the second configuration, of the first configuration (as described in the above embodiment which is not repeated here). After crossing a boundary of a period of the first configuration, a DMRS configuration changes on transmission occasions of both the first configuration and any of the second configurations.

For example, taking the second configuration 1 as an example, first to third transmission occasions within a period n of the second configuration 1 overlap with second to fourth transmission occasions in the period n of the first configuration in time domain; a fourth transmission occasion in the period n of the second configuration 1 overlaps with a first transmission occasion in a period n+1 of the first configuration in time domain. The first to third transmission occasions in the period n of the second configuration 1 correspond to DMRS1, and the fourth transmission occasion in the period n of the second configuration 1 corresponds to DMRS2.

As another implementation, the DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

The DMRSs corresponding to first TOs in one period in the first configuration are the same, and the DMRSs corresponding to first first TOs in at least two adjacent periods in the first configuration are different; or, the DMRSs corresponding to the first TOs in one period in the first configuration are the same, and the DMRSs correspond to Hybrid Automatic Repeat reQuest (HARQ) process numbers of transmissions in the period in a one-to-one manner, and DMRSs corresponding to different HARQ process numbers are different.

As shown in FIG. 5, an example of a DMRS corresponding to a transmission occasion is given. In this example, the first configuration, the second configuration 1, the second configuration 2, and the second configuration 3 are four kinds of configurations, in which a period of each configuration is P. In each period, 4 transmission occasions are configured to support 4 repetitive transmissions, and a starting position of a period of each configuration is shown in FIG. 5. A RV on any transmission occasion of any of the second configurations must be the same as a RV on a transmission occasion, at the same time instant as the any transmission occasion of the second configuration, of the first configuration.

For example, taking the second configuration 1 as an example, first to third transmission occasions within a period n of the second configuration 1 overlap with second to fourth transmission occasions in the period n of the first configuration in time domain; a fourth transmission occasion in the period n of the second configuration 1 overlaps with a first transmission occasion in a period n+1 of the first configuration in time domain. The transmission occasions in the period n of the second configuration 1 correspond to DMRS1, and the transmission occasions in the period n+1 of the second configuration 1 corresponds to DMRS2.

The information transmission method at a terminal side of the present disclosure is described above, and a corresponding terminal will be further described in the following embodiment with reference to the drawings.

Figure 10:
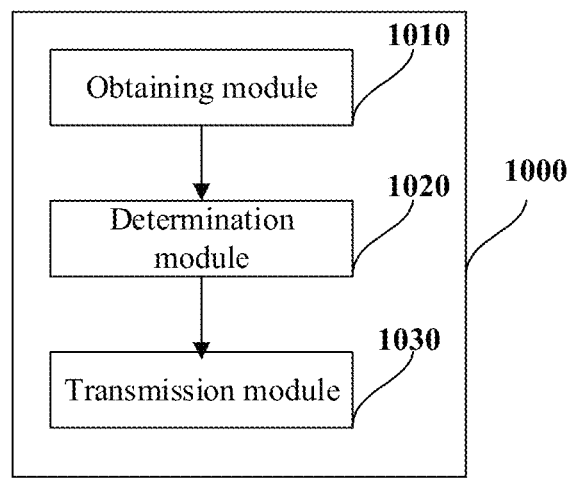
FIG. 10 is a block diagram of a terminal according to an embodiment of the present disclosure.

As shown in FIG. 10, an embodiment of the present disclosure further provides a terminal 1000. The terminal includes an obtaining module 1010, a determination module 1020, and a transmission module 1030.

The obtaining module 1010 is configured for obtaining configuration information of a first configuration of a physical uplink shared channel or a physical downlink shared channel.

The determination module 1020 is configured for determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same.

The transmission module 1030 is configured for transmitting the physical uplink shared channel or the physical downlink shared channel according to the RVs.

Optionally, the determination module 1020 includes a first determination unit and a second determination unit.

The first determination unit is configured for determining an RV corresponding to a first TO in the first configuration according to the configuration information. The second determination unit is configured for determining, according to the RV corresponding to the first TO, an RV corresponding to a second TO, in the second configuration, overlapping with the first TO in time domain.

Optionally, the terminal 1000 further includes a reception module configured for receiving indication information, the indication information being used to indicate determining Redundancy Versions (RVs) corresponding to Transmission Occasions (TOs) in a second configuration according to the configuration information of the first configuration.

The determination module 1020 includes a third determination unit, the third determination unit is configured for determining the RVs corresponding to the TOs in the second configuration according to the configuration information and the indication information.

Optionally, DeModulation Reference Signals (DMRSs) corresponding to the first TO and the second TO overlapped in time domain are the same.

Optionally, the DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

Optionally, the DMRSs corresponding to first TOs in one period in the first configuration are the same, and the DMRSs corresponding to first first TOs in at least two adjacent periods in the first configuration are different.

The embodiment of the terminal of the present disclosure corresponds to the embodiment of the method by the terminal, and all the implementations in the embodiment of the method are applicable to the embodiment of the terminal, and the same technical effect can be achieved.

The terminal 1000 in the embodiment of the present disclosure determines the RVs corresponding to the TOs in the second configuration of the physical uplink shared channel or the physical downlink shared channel according to the configuration information, sent by the network device, of the first configuration of the physical uplink shared channel or the physical downlink shared channel, and RVs corresponding to TOs overlapped in time domain in the first configuration and in the second configuration are the same. In this way, according to the configuration information of the first configuration, the RVs corresponding to the TOs in the second configuration can be determined, and therefore, the physical uplink shared channel or the physical downlink shared channel is transmitted according to the determined RV. Therefore, consumption of frequency-domain resources or DMRSs caused by blind detection can be avoided, and a resource efficiency can be improved.

Figure 11:
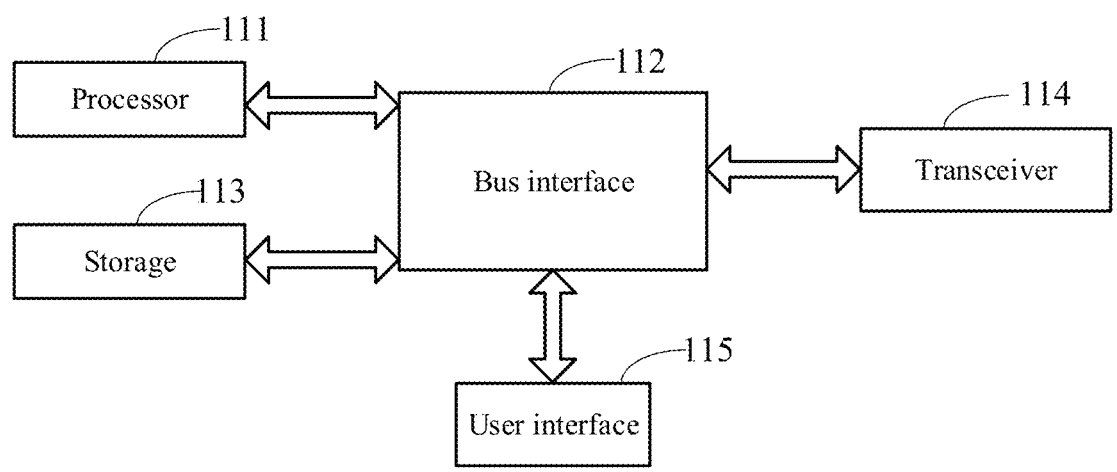
FIG. 11 is a block diagram of a terminal according to an embodiment of the present disclosure.

As shown in FIG. 11, the embodiments of the present disclosure also provide a terminal. The terminal includes a processor 111, a storage 113 connected to the processor 111 through a bus interface 11. The storage 113 is configured for storing programs and data used by the processor 111 when performing operations; when the processor 111 calls and executes the programs and data stored in the storage 113, the processor 111 implements the following steps.

The processor 111 is configured to read the computer program and perform the following steps: obtaining configuration information of a first configuration of a physical uplink shared channel or a physical downlink shared channel; determining Redundancy Versions (RVs) corresponding to Transmission Occasions (TOs) in a second configuration of the physical uplink shared channel or the physical downlink shared channel according to the configuration information, wherein, RVs corresponding to TOs overlapped in time domain in the first configuration and in the second configuration are the same; and transmitting the physical uplink shared channel or the physical downlink shared channel according to the RVs The processor 111 further implements the following steps when executing the computer program: determining an RV corresponding to a first TO in the first configuration according to the configuration information; determining, according to the RV corresponding to the first TO, an RV corresponding to a second TO, in the second configuration, overlapping with the first TO in time domain.

The processor 111 further implements the following steps when executing the computer program: receiving indication information, the indication information being used to indicate determining Redundancy Versions (RVs) corresponding to Transmission Occasions (TOs) in a second configuration according to the configuration information of the first configuration.

DeModulation Reference Signals (DMRSs) corresponding to the first TO and the second TO overlapped in time domain are the same.

The DMRS corresponding to each second TO in the first period is the same as a DMRS corresponding to a target TO, wherein, the target TO is a first TO, in the first configuration, that overlaps with a first second TO in the first period in time domain, the first period is one period in the second configuration.

The DMRSs corresponding to first TOs in one period in the first configuration are the same, and the DMRSs corresponding to first first TOs in at least two adjacent periods in the first configuration are different.

A transceiver 114 is connected to the bus interface 112, and is configured for receiving and transmitting data under the control of the processor 111.

It should be noted that, in FIG. 7, a bus architecture may include any number of interconnected buses and bridges. Specifically, various circuits such as one or more processors represented by the processor 111 and a storage represented by the storage 113 are linked together. The bus architecture may also link together various other circuits, such as peripherals, voltage regulators, and power management circuits, all of which are well known in the art and thus will not be described further herein. The bus interface provides an interface. The transceiver 114 may be a plurality of elements, i.e., including a transmitter and a receiving, for providing means for communicating with various other devices over a transmission medium. For different terminals, the user interface 115 may also be an interface capable of externally or internally connecting necessary devices, such as a keypad, a display, a speaker, a microphone, a joystick, and the like. The processor 111 is responsible for managing the bus architecture and general processing, and the storage 113 may store data used by the processor 111 when the processor 111 performs operations.

It will be understood by those skilled in the art that all or part of the steps for implementing the above-described embodiments may be performed by hardware, or may be performed by a computer program indicating relevant hardware, the computer program includes instructions for performing part or all of the steps of the above method; and the computer program may be stored in a readable storage medium, which may be any form of storage medium.

An embodiment of the present disclosure also provides a computer-readable storage medium. The computer-readable storage medium having stored thereon a computer program. When the computer program is executed by a processor, each process of the embodiment of the information transmission method can be implemented, and the same technical effect can be achieved, which is not repeated here. The computer-readable storage medium is such as a Read-Only Memory (ROM), a Random Access Memory (RAM), a magnetic disk, or optical disk, etc.

In addition, it should be noted that in the devices and the methods of the present disclosure, components or steps may be disassembled and/or recombined, such decomposition and/or recombination should be considered as equivalent solutions of the present disclosure. Also, the steps for executing the above-described series of processes may naturally be executed in a chronological order in the described order, but are not necessary to be executed in the chronological order, and some steps may be executed in parallel or independently of each other. It may be understood by those skilled in the art that all or any steps or components of the methods and the devices of the present disclosure may be implemented in hardware, firmware, software, or combinations thereof in any computing device (including processors, storage media, etc.) or a network of computing devices. This can be accomplished by one of ordinary skill in the art using their basic programming skills after reading the description of the present disclosure.

Accordingly, the objective of the present disclosure may also be achieved by running a program or a set of programs on any computing device. The computing device may be a well-known general purpose device. Accordingly, the objective of the present disclosure may also be achieved by merely providing a program product containing program codes used to implement the methods or the devices. That is, such a program product also constitutes the present disclosure, and a storage medium storing such a program product also constitutes the present disclosure. Obviously, the storage medium may be any known storage medium or any storage medium to be developed in the future. It should also be noted that in the devices and the methods of the present disclosure, components or steps may be disassembled and/or recombined, such decomposition and/or recombination should be considered as equivalent solutions of the present disclosure. Also, the steps for executing the series of processes described above may be executed in a chronological order naturally in the described order, but are not always necessary to be executed in the chronological order. Certain steps may be performed in parallel or independently of each other.

It will be appreciated that the embodiments described in the embodiments of the present disclosure may be implemented in hardware, software, firmware, middleware, microcode, or combinations thereof. For hardware implementation, units, modules, sub-units and sub-modules may be implemented in one or more Application Specific Integrated Circuits (ASICs), Digital Signal Processing (DSP), DSP Device (DSPD), Programmable Logic Device (PLD), Field-Programmable Gate Array (FPGA), general purpose processors, controllers, microcontrollers, microprocessors, other electronic units for performing the functions described in the present disclosure, or combinations thereof.

For software implementation, techniques described in the embodiments of the present disclosure may be implemented by modules (e.g., processes, functions, etc.) that perform the functions described in the embodiments of the present disclosure. Software codes may be stored in a memory and executed by a processor. The memory may be implemented in the processor or external to the processor.

The foregoing provides optional embodiments of the present disclosure, and it should be noted that several modifications and embellishments may be made by those of ordinary skill in the art without departing from the principles set forth in the present disclosure, these modifications and embellishments should also be considered to be within the protection scope of the present disclosure.

What is claimed is:

1. An information transmission method performed by a network device, comprising:
　　sending configuration information of a first configuration of a physical uplink shared channel or a physical downlink shared channel;
　　determining Redundancy Versions (RV) corresponding to Transmission Occasions (TO) in a second configuration of the physical uplink shared channel or the physical downlink shared channel according to the configuration information of the first configuration, wherein, RVs corresponding to TOs overlapped in time domain in the first configuration and in the second configuration are the same;
　　transmitting the physical uplink shared channel or the physical downlink shared channel according to the RVs,
　　wherein
　　determining the RVs corresponding to the TOs in the second configuration of the physical uplink shared channel or the physical downlink shared channel according to the configuration information of the first configuration comprises:
　　　　determining an RV corresponding to a first TO in the first configuration according to the configuration information of the first configuration;

determining, according to the RV corresponding to the first TO, an RV corresponding to a second TO overlapping with the first TO in time domain in the second configuration, wherein, DeModulation Reference Signals (DMRS) corresponding to the first TO and the second TO overlapped in time domain are the same, DMRSs corresponding to first TOs in one period in the first configuration are the same, and DMRSs corresponding to first first TOs in at least two adjacent periods in the first configuration are different; or wherein, a DeModulation Reference Signal (DMRS) corresponding to each second TO in a first period is the same as a DMRS corresponding to a target TO, wherein, the target TO is a first TO, in the first configuration, that overlaps with a first one of second TOs in the first period in time domain, the first period is one period in the second configuration.

2. The information transmission method according to claim 1, further comprising:
sending indication information, the indication information being used to indicate determining RVs corresponding to TOs in a second configuration according to the configuration information of the first configuration.

3. A network device, comprising a transceiver, a storage, a processor and a computer program stored on the storage and executable by the processor, wherein, when the processor executes the computer program, the processor implements all steps of the information transmission method according to claim 1.

4. The network device according to claim 3, wherein when the processor executes the computer program, the processor implements a following step:
sending indication information, the indication information being used to indicate determining the RVs corresponding to the TOs in the second configuration according to the configuration information of the first configuration.

5. An information transmission method performed by a terminal, comprising:
obtaining configuration information of a first configuration of a physical uplink shared channel or a physical downlink shared channel;
determining Redundancy Versions (RV) corresponding to Transmission Occasions (TO) in a second configuration of the physical uplink shared channel or the physical downlink shared channel according to the configuration information of the first configuration, wherein, RVs corresponding to TOs overlapped in time domain in the first configuration and in the second configuration are the same;
transmitting the physical uplink shared channel or the physical downlink shared channel according to the RVs,
wherein, determining the RVs corresponding to the TOs in the second configuration of the physical uplink shared channel or the physical downlink shared channel according to the configuration information of the first configuration comprises:
determining an RV corresponding to a first TO in the first configuration according to the configuration information of the first configuration;
determining, according to the RV corresponding to the first TO, an RV corresponding to a second TO overlapping with the first TO in time domain in the second configuration;
wherein, DeModulation Reference Signals (DMRS) corresponding to the first TO and the second TO overlapped in time domain are the same, DMRSs corresponding to first TOs in one period in the first configuration are the same, and DMRSs corresponding to first first TOs in at least two adjacent periods in the first configuration are different; or wherein, a DeModulation Reference Signal (DMRS) corresponding to each second TO in a first period is the same as a DMRS corresponding to a target TO, wherein, the target TO is a first TO, in the first configuration, that overlaps with a first one of second TOs in the first period in time domain, the first period is one period in the second configuration.

6. The information transmission method according to claim 5, further comprising:
receiving indication information, the indication information being used to indicate determining the RVs corresponding to the TOs in the second configuration according to the configuration information of the first configuration;
wherein determining the RVs corresponding to the TOs in the second configuration of the physical uplink shared channel or the physical downlink shared channel according to the configuration information of the first configuration comprises:
determining an RV corresponding to each TO in the second configuration according to the configuration information of the first configuration and the indication information.

7. A terminal, comprising a transceiver, a storage, a processor, and a computer program stored on the storage and executable by the processor, wherein when the processor executes the computer program, the processor implements following steps:
obtaining configuration information of a first configuration of a physical uplink shared channel or a physical downlink shared channel;
determining Redundancy Versions (RV) corresponding to Transmission Occasions (TO) in a second configuration of the physical uplink shared channel or the physical downlink shared channel according to the configuration information of the first configuration, wherein, RVs corresponding to TOs overlapped in time domain in the first configuration and in the second configuration are the same;
transmitting the physical uplink shared channel or the physical downlink shared channel according to the RVs,
wherein, when the processor executes the computer program, the processor implements following steps:
determining an RV corresponding to a first TO in the first configuration according to the configuration information of the first configuration;
determining, according to the RV corresponding to the first TO, an RV corresponding to a second TO overlapping with the first TO in time domain in the second configuration;
wherein, DeModulation Reference Signals (DMRS) corresponding to the first TO and the second TO overlapped in time domain are the same, DMRSs corresponding to first TOs in one period in the first configuration are the same, and DMRSs corresponding to first first TOs in at least two adjacent periods in the first configuration are different; or
wherein, a DeModulation Reference Signal (DMRS) corresponding to each second TO in a first period is the same as a DMRS corresponding to a target TO, wherein, the target TO is a first TO, in the first configuration, that overlaps with a first one of second TOs in the first period in time domain, the first period is one period in the second configuration.

8. The terminal according to claim 7, wherein when the processor executes the computer program, the processor implements following steps:
   receiving indication information, the indication information being used to indicate determining the RVs corresponding to the TOs in the second configuration according to the configuration information of the first configuration;
   determining an RV corresponding to each TO in the second configuration according to the configuration information of the first configuration and the indication information.

9. A non-transitory computer-readable storage medium, comprising:
   a computer program stored on the computer-readable storage medium, wherein when the computer program is executed by a processor, the processor implements all steps of the information transmission method according to claim 1.

10. A non-transitory computer-readable storage medium, comprising:
   a computer program stored on the computer-readable storage medium, wherein when the computer program is executed by a processor, the processor implements all steps of the information transmission method according to claim 5.

* * * * *